United States Patent
Mantravadi et al.

(10) Patent No.: US 9,185,720 B2
(45) Date of Patent: Nov. 10, 2015

(54) METHOD AND APPARATUS TO FACILITATE SUPPORT FOR MULTI-RADIO COEXISTENCE

(75) Inventors: Ashok Mantravadi, San Diego, CA (US); Tamer A. Kadous, San Diego, CA (US); Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 13/007,190

(22) Filed: Jan. 14, 2011

(65) Prior Publication Data

US 2012/0033645 A1 Feb. 9, 2012

Related U.S. Application Data

(60) Provisional application No. 61/370,717, filed on Aug. 4, 2010.

(51) Int. Cl.
| | | |
|---|---|---|
| *H04W 72/12* | (2009.01) | |
| *H04W 72/04* | (2009.01) | |
| *H04W 16/14* | (2009.01) | |
| *H04W 88/06* | (2009.01) | |

(52) U.S. Cl.
CPC ........ *H04W 72/1215* (2013.01); *H04W 72/044* (2013.01); *H04W 72/048* (2013.01); *H04W 16/14* (2013.01); *H04W 88/06* (2013.01)

(58) Field of Classification Search
CPC . H04W 16/14; H04W 72/044; H04W 72/048; H04W 88/06; H04B 1/005
USPC ................. 370/338, 344, 347, 478; 455/41.2, 455/552.1
See application file for complete search history.

(56) References Cited

U.S. PATENT DOCUMENTS

| | | | |
|---|---|---|---|
| 7,941,178 B2* | 5/2011 | Guo et al. | 455/552.1 |
| 8,121,068 B2* | 2/2012 | Zhu | 370/326 |
| 2006/0194600 A1 | 8/2006 | Palin et al. | |
| 2007/0275746 A1 | 11/2007 | Bitran | |
| 2008/0299987 A1 | 12/2008 | Iyer et al. | |
| 2010/0322287 A1* | 12/2010 | Truong et al. | 375/133 |
| 2011/0097998 A1* | 4/2011 | Ko et al. | 455/41.2 |
| 2011/0312288 A1* | 12/2011 | Fu et al. | 455/88 |
| 2012/0020256 A1* | 1/2012 | Tujkovic et al. | 370/278 |

FOREIGN PATENT DOCUMENTS

| | | |
|---|---|---|
| CN | 101646245 A | 2/2010 |
| CN | 101743735 A | 6/2010 |

(Continued)

OTHER PUBLICATIONS

International Search Report and Written Opinion—PCT/US2011/046473—ISA/EPO—Dec. 23, 2011.

*Primary Examiner* — Habte Mered
(74) *Attorney, Agent, or Firm* — QUALCOMM Incorporated IP Department

(57) ABSTRACT

A method of wireless communication includes determining a frame offset between communications of a first communication resource (e.g., an LTE radio) and communications of a second communication resource (e.g., a Bluetooth or WLAN radio). The method also includes determining potential time slot configurations for the communications of the second communication resource. A time slot configuration is selected from the determined potential time slot configurations, to reduce degradation of the first communication resource due to conflicting time slots between the first communication resource and the second communication resource, based on the determined frame offset. The selection may be based on the determined frame offset.

20 Claims, 10 Drawing Sheets

(56) References Cited

FOREIGN PATENT DOCUMENTS

| EP | 2136591 | A2 | 12/2009 |
|---|---|---|---|
| JP | 2010522448 | A | 7/2010 |
| JP | 2010524346 | A | 7/2010 |
| WO | WO2007008981 | | 1/2007 |
| WO | WO-2008078311 | A2 | 7/2008 |
| WO | WO-2008124434 | A1 | 10/2008 |

\* cited by examiner

METHOD AND APPARATUS TO FACILITATE SUPPORT FOR MULTI-RADIO COEXISTENCE

CROSS REFERENCE TO RELATED APPLICATION

This application claims the benefit of U.S. Provisional Patent Application No. 61/370,717 filed Aug. 4, 2010, entitled "METHOD AND APPARATUS TO FACILITATE SUPPORT FOR MULTI-RADIO COEXISTENCE," the disclosure of which is expressly incorporated herein by reference in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

A method for wireless communications is offered. The method includes determining a frame offset between communications of a first communication resource and communications of a second communication resource. The method also includes determining potential time slot configurations for the communications of the second communication resource. The method further includes selecting a time slot configuration, from the determined potential time slot configurations, that reduces degradation of the first communication resource due to conflicting time slots between the first communication resource and the second communication resource, based on the determined frame offset.

An apparatus operable in a wireless communication system includes means for determining a frame offset between communications of a first communication resource and communications of a second communication resource. The apparatus also includes means for determining potential time slot configurations for the communications of the second communication resource. The apparatus further includes means for selecting a time slot configuration, from the determined potential time slot configurations, that reduces degradation of the first communication resource due to conflicting time slots between the first communication resource and the second communication resource, based on the determined frame offset.

A computer program product configured for wireless communication is offered. The computer program product includes a computer-readable medium having program code recorded thereon. The program code includes program code to determine a frame offset between communications of a first communication resource and communications of a second communication resource. The program code also includes program code to determine potential time slot configurations for the communications of the second communication resource. The program code further includes program code to select a time slot configuration, from the determined potential time slot configurations, that reduces degradation of the first communication resource due to conflicting time slots between the first communication resource and the second communication resource, based on the determined frame offset.

An apparatus configured for operation in a wireless communication network is offered. The apparatus includes a memory and a processor(s) coupled to memory. The processor(s) is configured to determine a frame offset between communications of a first communication resource and communications of a second communication resource. The processor(s) is also configured to determine potential time slot configurations for the communications of the second communication resource. The processor(s) is further configured to select a time slot configuration, from the determined potential time slot configurations, that reduces degradation of the first communication resource due to conflicting time slots between the first communication resource and the second communication resource, based on the determined frame offset.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
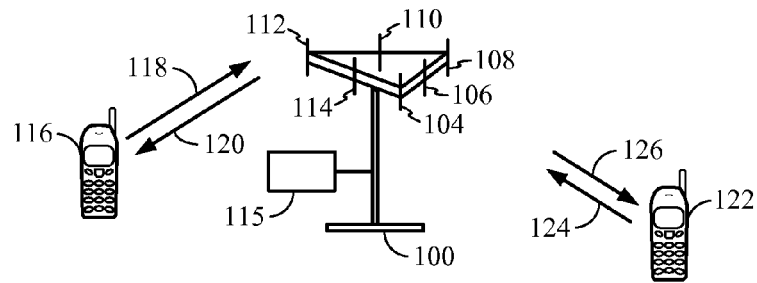
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for Bluetooth/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a is multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
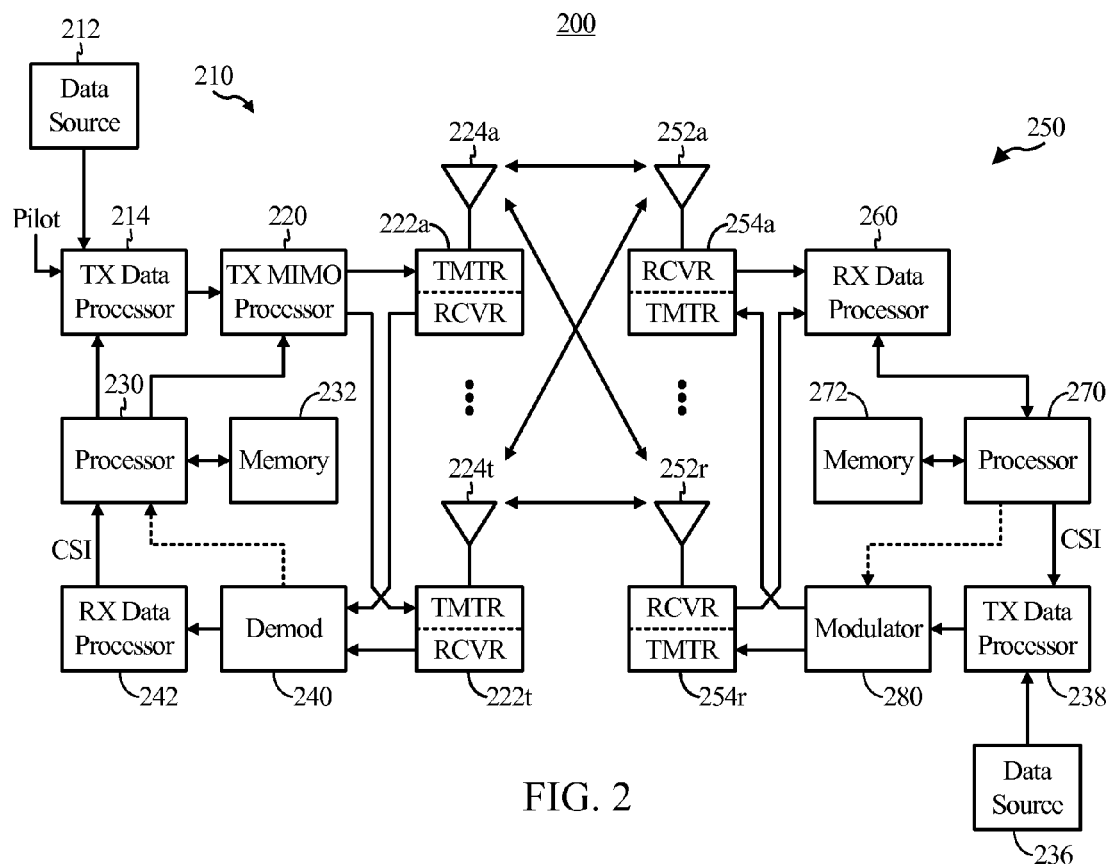
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, wherein NS≤min{NT, NR}. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides NT modulation symbol streams to NT transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from the transmitters 222a through 222t are then transmitted from NT antennas 224a through 224t, respectively.

At a receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NR "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
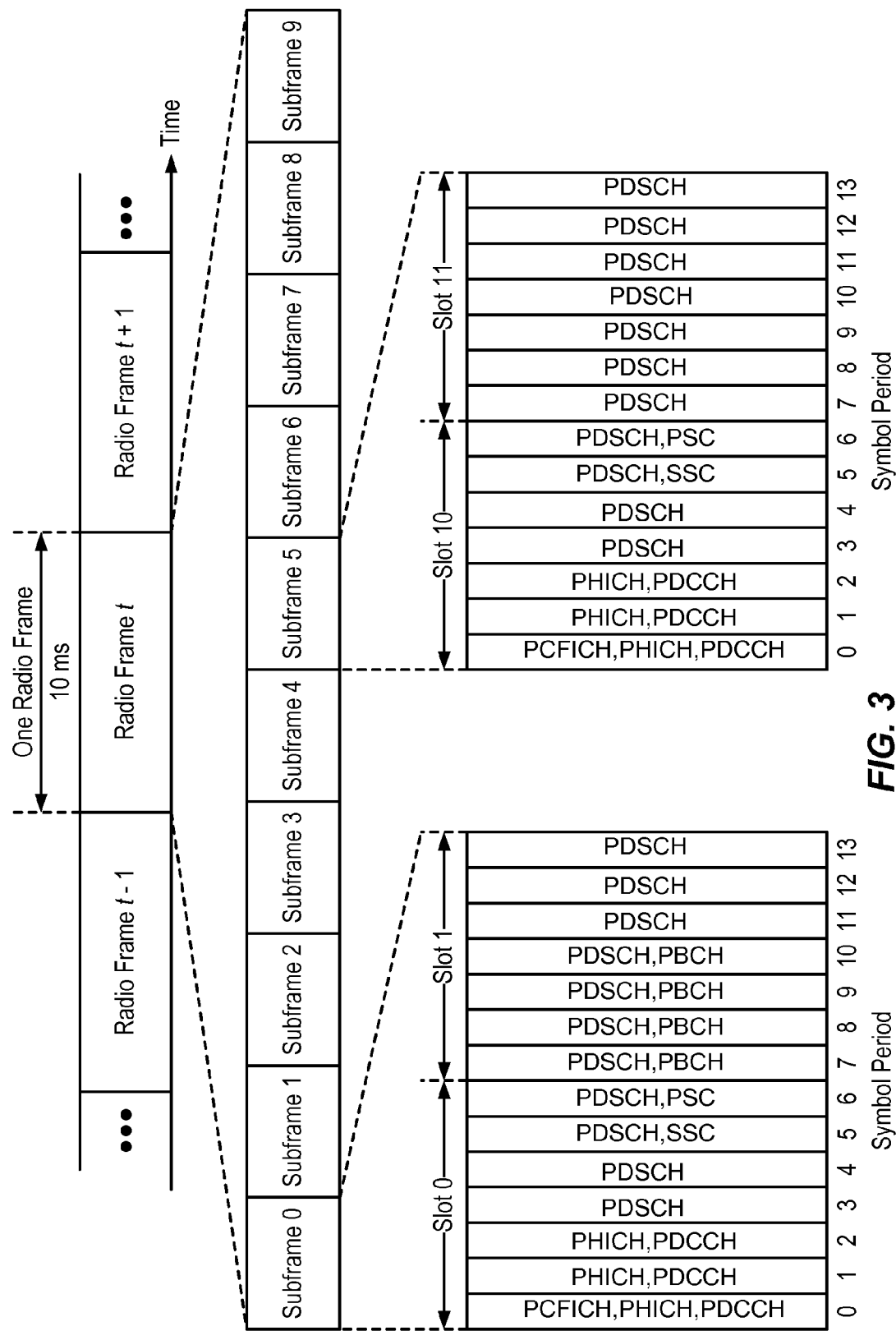
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
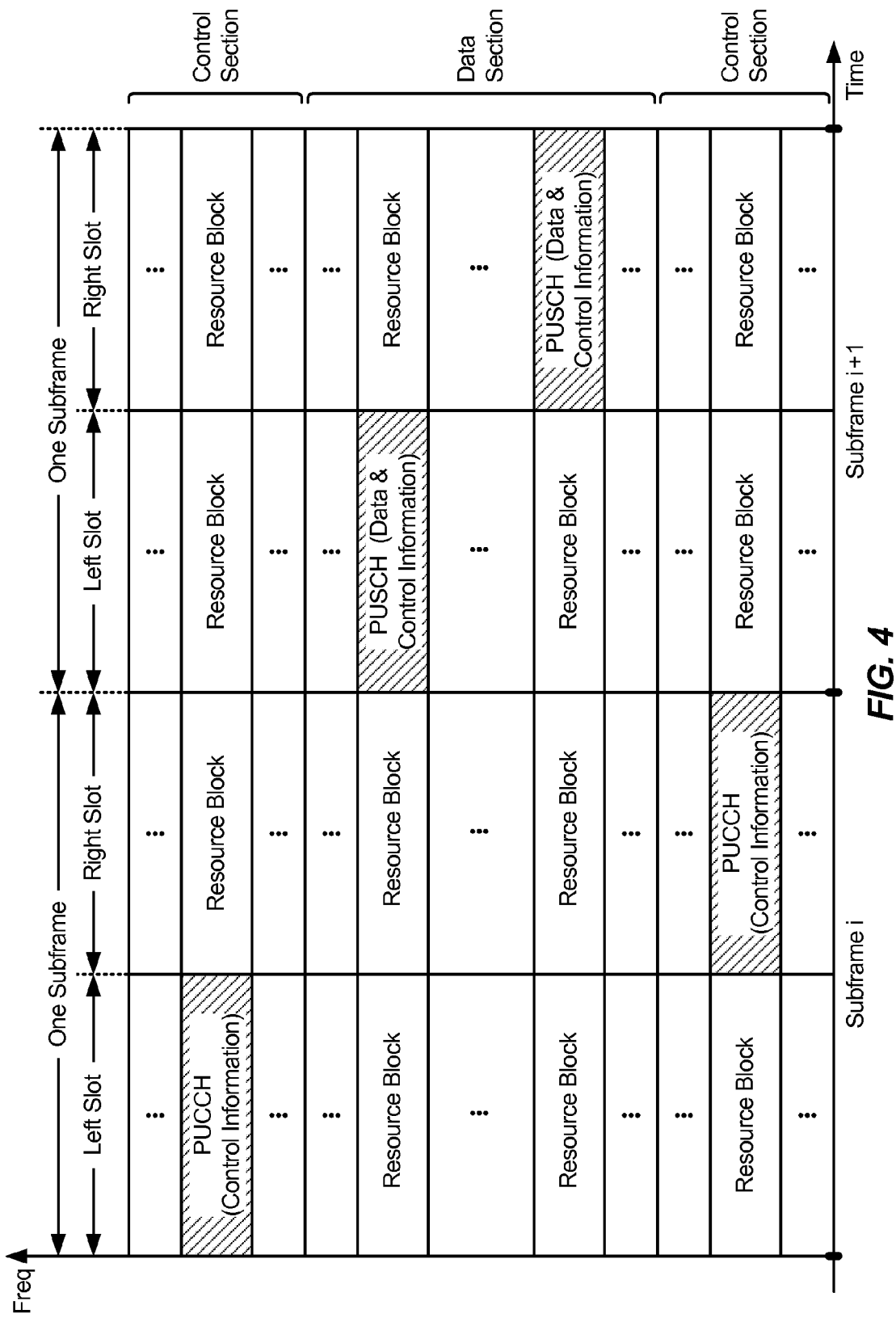
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
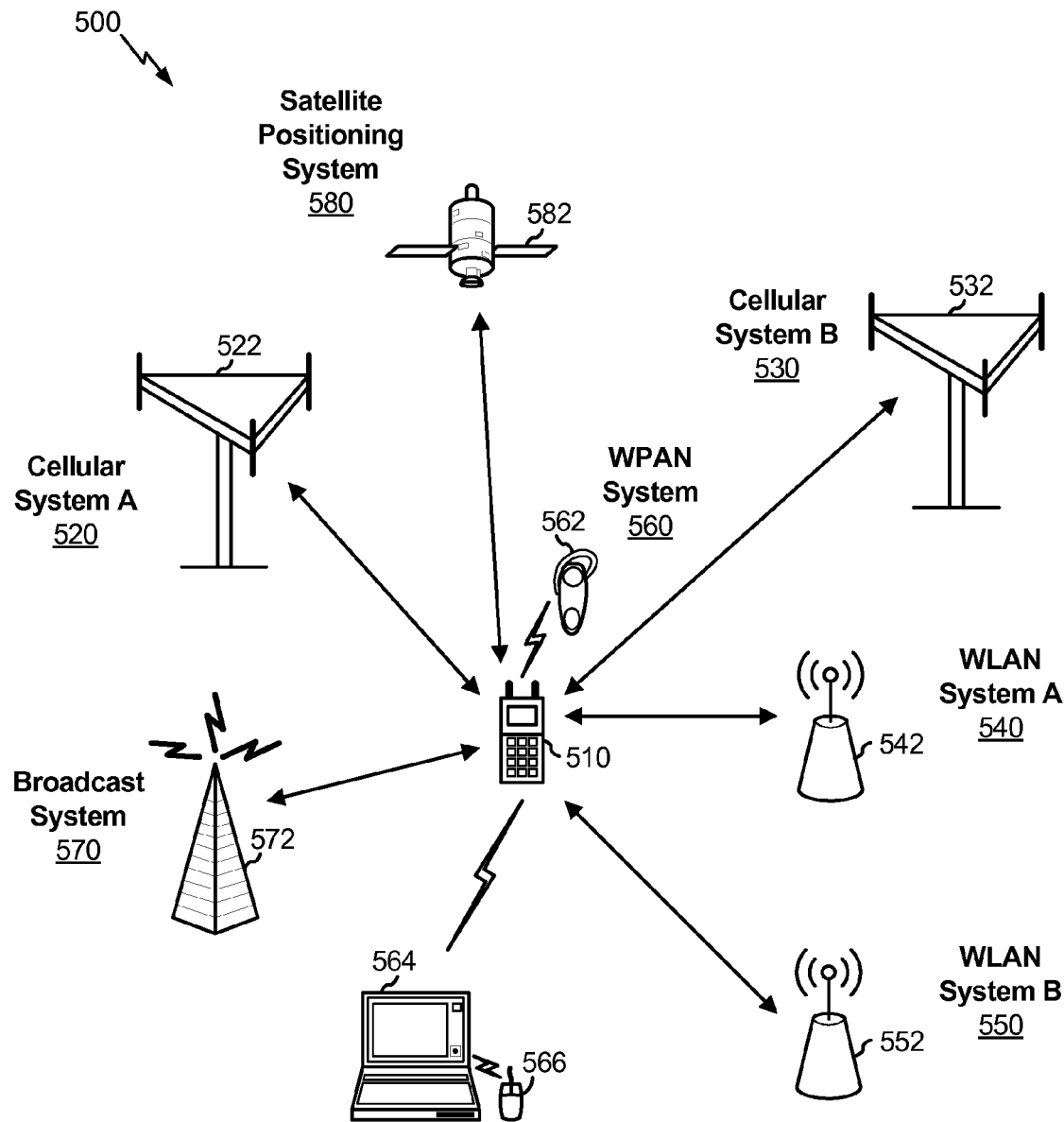
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
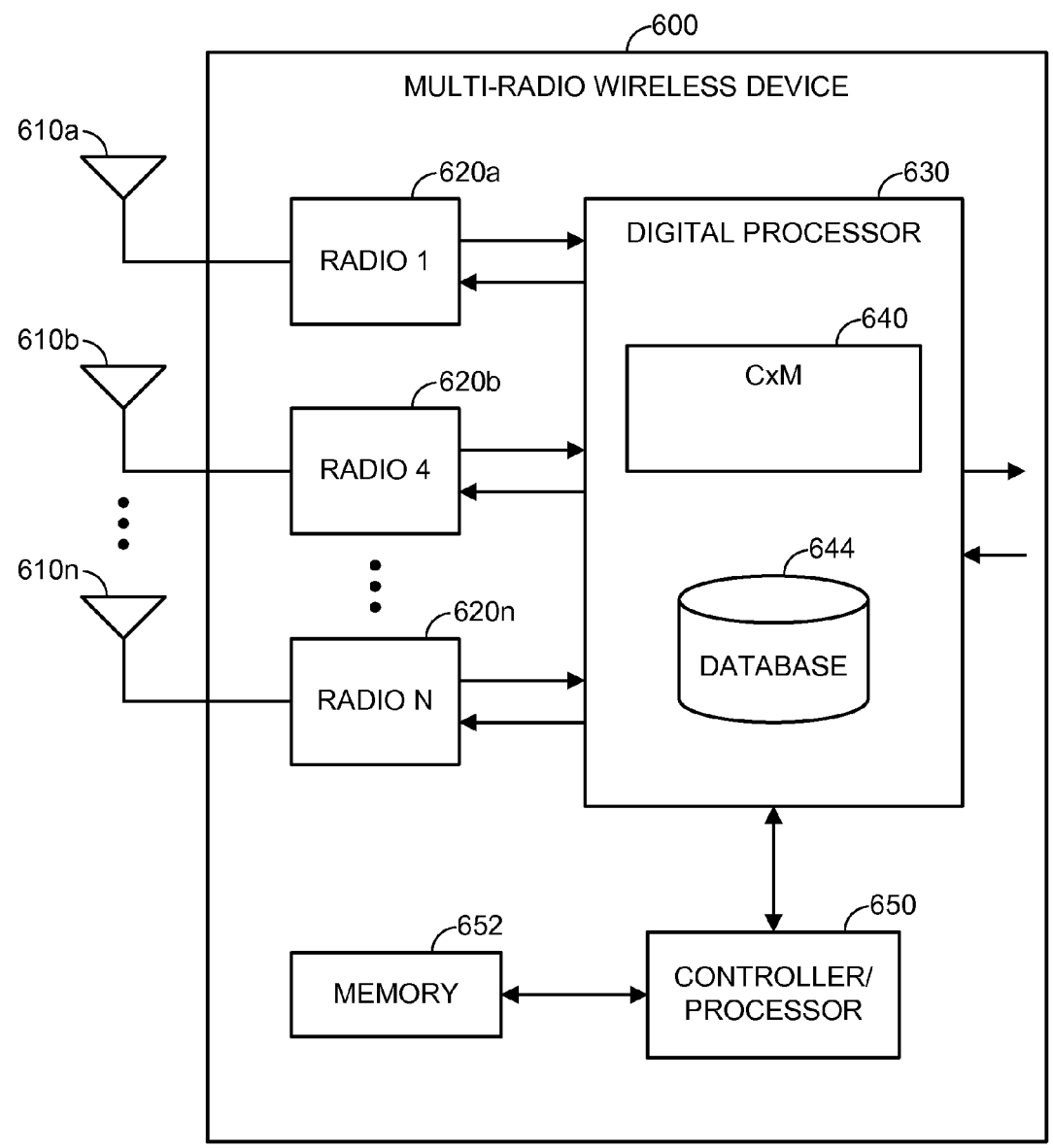
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
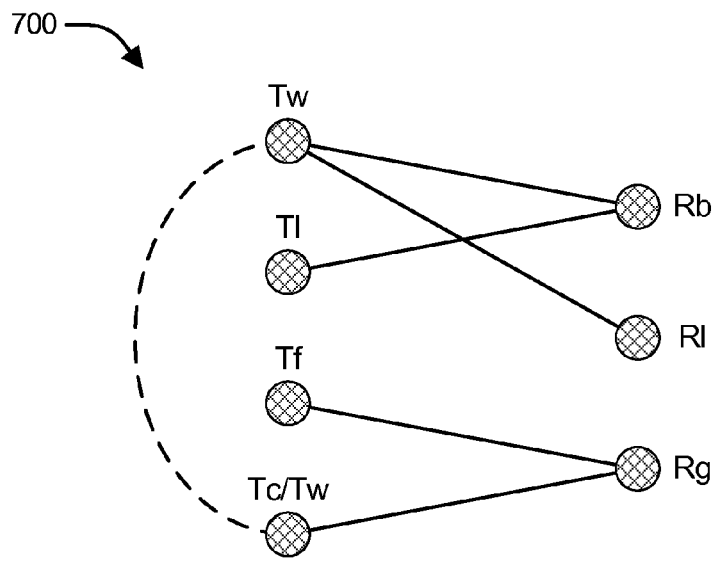
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as that illustrated in FIG. 12. By way of farther illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
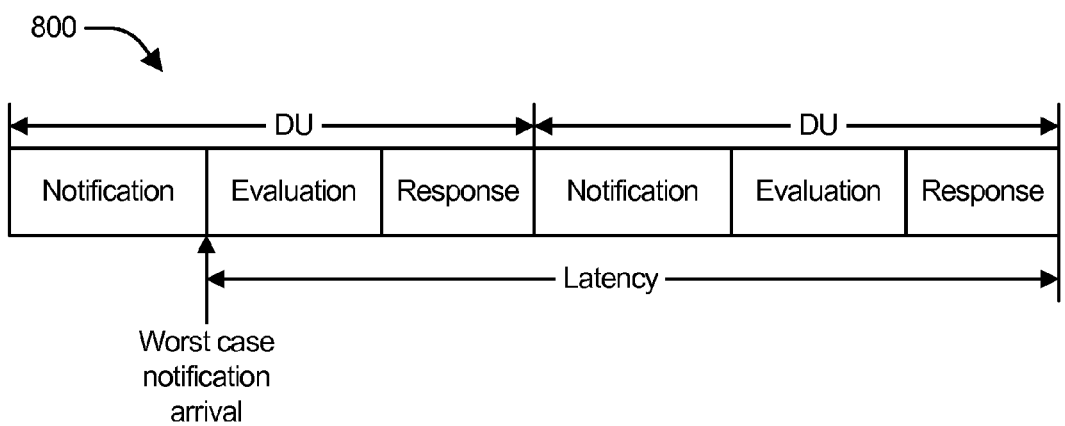
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by a UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Figure 9:
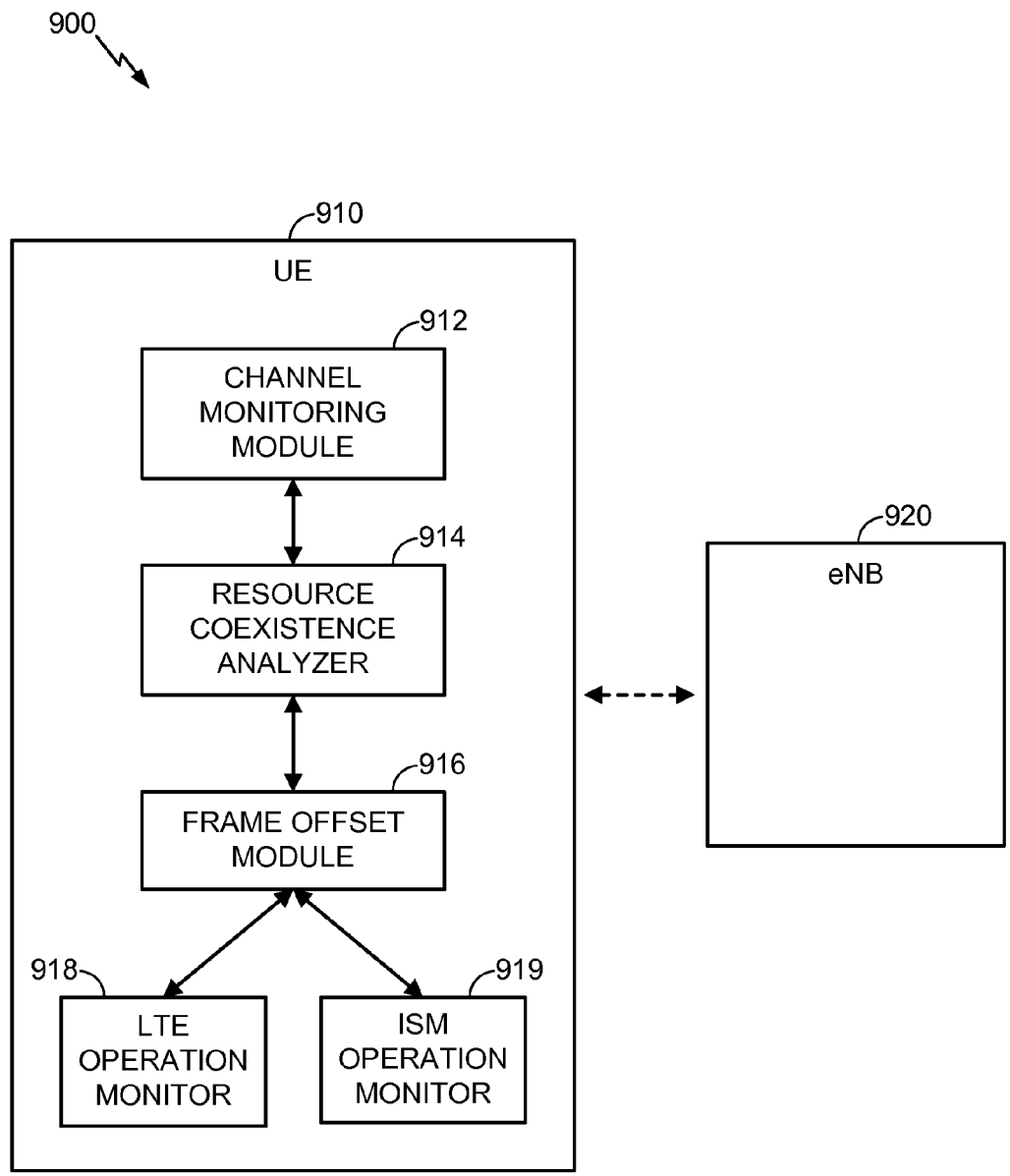
FIG. 9 is a block diagram of a system for providing support within a wireless communication environment for multi-radio coexistence management according to one aspect of the present disclosure.

Turning now to FIG. 9, a block diagram of a system 900 for providing support within a wireless communication environment for multi-radio coexistence management is illustrated. In an aspect, the system 900 can include one or more UEs 910 and/or eNBs 920, which can engage in UL, DL, and/or any other suitable communication with each other and/or any other entities in the system 900. In one example, the UE 910 and/or eNB 920 can be operable to communicate using a variety resources, including frequency channels and sub-bands, some of which can potentially be colliding with other radio resources (e.g., a Bluetooth radio). Thus, the UE 910 can utilize various techniques for managing coexistence between multiple radios utilized by the UE 910, as generally described herein.

To mitigate at least the above shortcomings, the UE 910 can utilize respective features described herein and illustrated by the system 900 to facilitate support for multi-radio coexistence within the UE 910. The various modules including the channel monitoring module 912, resource coexistence analyzer 914, frame offset module 916, LTE operation monitor 918, and ISM operation monitor 919 and other modules may be configured to implement the embodiments discussed below.

In a mobile communications user equipment (UE) there may be interference issues between a Long Term Evolution (LTE) radio (particularly in Band 40 (2.3-2.4 GHz) and Band 7 (2.5 GHz)) and a radio used for industrial, scientific and medical (ISM) band communications (in particular Bluetooth and wireless local area network (WLAN)). The interference is further complicated because LTE and Bluetooth (BT) are asynchronous with respect to each other. One LTE frame including a receive/downlink (DL) subframe and a transmit/uplink (UL) subframe is 5 milliseconds. In that same time period Bluetooth has 8 time slots, alternating between receive and transmit. If one radio is transmitting while the other is trying to receive, there will be interference on the receive side.

Figure 10:
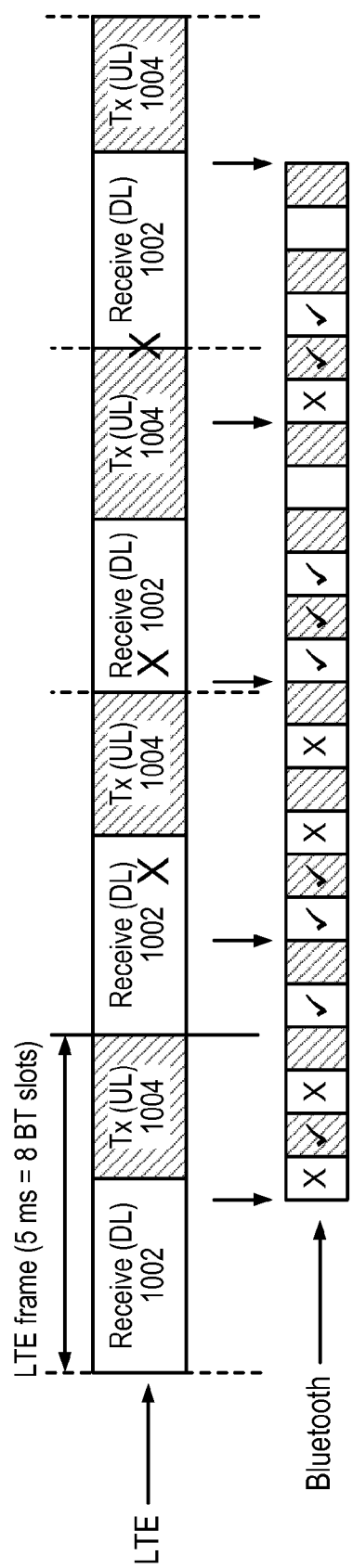
FIG. 10 illustrates radio interference between a Long Term Evolution radio and a Bluetooth radio.

FIG. 10 illustrates interference on a timeline for LTE Band 40 (TDD LTE (time division duplex LTE)) and Bluetooth with no coexistence manager. As shown, each LTE frame is 5 or 10 milliseconds long, depending on the LTE configuration. A 5 ms frame is illustrated, with three one ms timeslots of downlink receive (shown grouped as timeslots 1002) and two one ms timeslots of uplink transmit (shown grouped as timeslots 1004). As illustrated, each Bluetooth enhanced synchronous connection oriented (eSCO) interval (between the arrows) consists of six timeslots (each 625 microseconds long) beginning with a receive slot and alternating between receive and transmit (transmit indicated with shading). In the illustration Bluetooth is configured to be in slave mode. Other eSCO configurations and Bluetooth traffic types are possible and may be used with the present disclosure. For purposes of FIG. 10, LTE is assumed to be always operating. In each timeslot a check mark (✓) indicates when Bluetooth is successfully operating. An X indicates interference. An overlap between one radio's active transmit time slot with the other's receive time slot (and vice versa) will cause interference, resulting in an X. As illustrated, one active LTE transmit/receive timeslot may interfere with multiple Bluetooth receive/transmit timeslots. Because the time slots of the two radios are not synchronized, frequent and unpredictable interference occurs.

Figure 11:
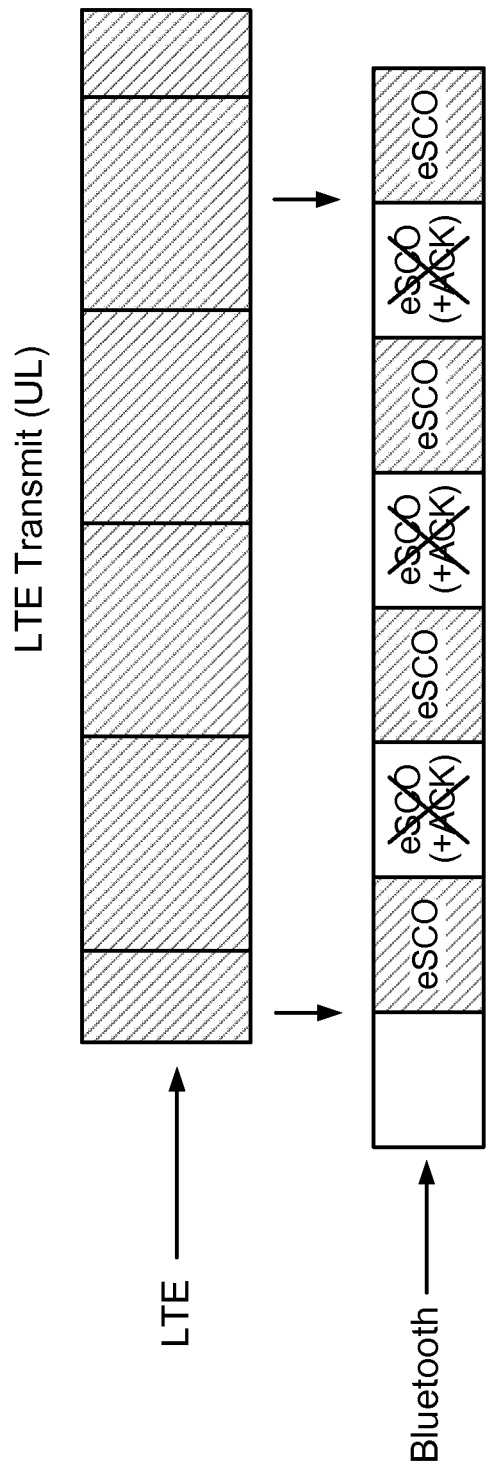
FIG. 11 illustrates radio interference between a Long Term Evolution radio and a Bluetooth radio.

FIG. 11 illustrates interference on a timeline for LTE Band 7 (FDD LTE (frequency division duplex LTE)) with no coexistence manager. An X indicates interference. In the example of FIG. 11, the interference occurs between the LTE transmit slots and the Bluetooth receive slots. LTE is presumed to always be transmitting (as shown by the shaded LTE timeslots). As shown, each Bluetooth receive (unshaded) timeslot using an enhanced synchronous connection oriented (eSCO) plus acknowledge (+ACK) link, is interfered with by the LTE transmissions.

Several eSCO arbitration schemes may be considered to reduce the illustrated interference. For the examples discussed below, the Bluetooth device in the UE is considered to be a slave.

In one arbitration scheme, no coexistence manager (CxM) is present. This scheme generally causes significant degradation to LTE downlink communications and can also impair Bluetooth enhanced synchronous connection oriented (eSCO) transmission, depending on the number of retransmissions and LTE configuration. In another scheme LTE may be given priority over Bluetooth, which would cause significant interference with Bluetooth eSCO operation, as shown in FIG. 11. In another arbitration scheme Bluetooth may be given priority over LTE, however this may cause significant LTE performance degradation. A fourth arbitration scheme based on a history of UE transmissions/reception may achieve similar results to a Bluetooth priority scheme due to high eSCO packet error rate (PER) criteria.

Offered is a method to allow time division multiplexing (TDM) arbitration schemes between LTE and ISM (e.g., Bluetooth or WLAN) radios. The arbitration schemes can be customized for particular cases to achieve improved performance of the two radios by determining potential time slot configurations (i.e. selecting specific time slots for transmit or receive and preventing communications in other time slots) and selecting a desired time slot configuration. Given stringent Bluetooth latency requirements (which correspond to an eSCO interval), the method preserves Bluetooth transmission while reducing LTE degradation. According to one aspect of the method, LTE has priority as often as possible, with priority given to Bluetooth only in some cases. Bin jumping and LTE frame information may further improve the solution. Frame offset information may also be used to determine the improved priority for each of the Bluetooth slots in the eSCO interval. Frame offset information may be used to align the desired time slot configuration to improve performance. Signal priorities may be chosen to reduce the impact to LTE performance (for example, choosing to prioritize a Bluetooth receive slot that only overlaps with one LTE transmit slot). These priorities may change as the frame offset between the radios changes.

In one aspect, the UE may assume that the minimum acceptable performance for enhanced synchronous connection oriented (eSCO) is that of synchronous connection oriented (SCO) communications. While, this may not be the case, the assumption will give a lower bound on LTE throughput degradation, thus reducing LTE degradation while ensuring that Bluetooth is allowed at least one transmit and one receive slot in each eSCO interval. With each eSCO interval having six timeslots and two re-transmissions, there are only five ways for eSCO to succeed with only one transmit (T) and one receive (R) slot (where 'X' denotes a slot that is not used or denied):

```
R T X X X X
X X R T X X
X X X X R T
X T R X X X
X T X X R X
```

The above potential time slot configurations apply due to certain polling rules. The first two timeslots are reserved and permit transmission but otherwise the transmit timeslot immediately follows a receive timeslot while Bluetooth is in slave mode. A desired time slot configuration may be chosen to reduce interference between LTE and Bluetooth while maintaining desired performance levels.

An approach assigning priority to various timeslots may then be used. For a given eSCO configuration, the CxM may identify equivalent SCO sequences. For each eSCO interval and for each equivalent SCO sequence, the CxM may identify the number of conflicting LTE transmit sub-frames and LTE receive sub-frames that would be denied if a particular Bluetooth sequence was given higher priority than LTE. The CxM may then choose the Bluetooth sequence with a reduced or minimum LTE interruption or degradation and apply priority assignments for the appropriate transmit and receive slots to allow Bluetooth operation while reducing LTE interruption. LTE degradation may be determined in a number of ways including the sum of transmit and receive degraded slots, but it may also be determined using a weighted sum. The above priority determinations may repeat whenever a frame offset changes, for example after four eSCO intervals if the overall timing offset between LTE and Bluetooth remains the same. If it is possible to stop LTE transmissions, the above approach may also be used to select LTE subframes that should not transmit, thereby reducing overlap with Bluetooth communications.

The above techniques may avoid instances where granting a Bluetooth slot denies two LTE sub-frames. Further, the above techniques may be applied to both LTE bands (e.g., Band 7 (2.5 GHz) and Band 40 (2.3-2.4 GHz) adjacent to the ISM bands. Other information may also be used to improve performance. For example, if particular slots are transmitted or received on channels that are prone to interference, bin jumping may be applied to give higher priority to slots with channels less prone to interference. Information on transmit power or received signal strength indication (RSSI) may also be used to prioritize certain time slots.

Figure 12:
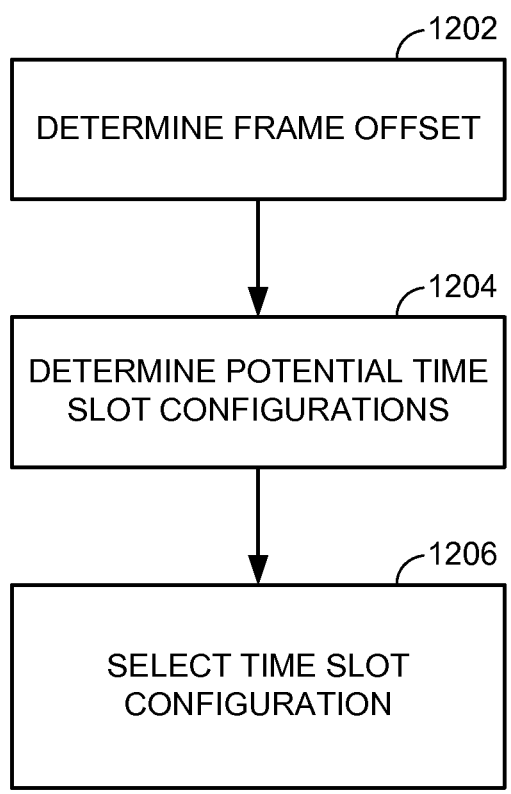
FIG. 12 is a flow diagram for determining a coexistence policy for communication resource operation according to one aspect of the present disclosure.

As shown in FIG. 12, a coexistence manager may determine a coexistence policy for communication resource operation within a user equipment (UE). At block 1202 a frame offset between communications of a first communication resource (e.g., an LTE radio) and communications of a second communication resource (e.g., a Bluetooth or WLAN radio) is determined. At block 1204, potential time slot configurations are determined for the communications of the second communication resource. At block 1206, a time slot configuration is selected and communications are controlled based on the selected time slot configuration and the determined frame offset. In one example, a time slot configuration is selected from the determined potential time slot configurations, to reduce degradation of the first communication resource due to conflicting time slots between the first communication resource and the second communication resource, based on the determined frame offset.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems. Similarly, although the description is with respect to Bluetooth, it should appreciated that the present disclosure is equally applicable to other technologies, e.g., WLAN.

In one configuration, the UE configured for wireless communication includes means for determining a frame offset, means for determining potential time slot configurations, and means for selecting a time slot configuration. In one aspect, the aforementioned means may be the resource coexistence analyzer 914, and/or the frame offset module 916 configured to perform the functions recited by the aforementioned means. In another aspect, the aforementioned means may be a module or any apparatus configured to perform the functions recited by the aforementioned means.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of arbitrating between wireless communications of different radio access technologies, comprising:
   determining, by a wireless device, a frame offset between communications of a first radio modem of the wireless device and communications of a second radio modem of the wireless device, the communications of the first radio modem asynchronous with the communications of the second radio modem;
   determining, by the wireless device, a plurality of potential time slot configurations that may be used for an interval of the communications of the second radio modem, each of the plurality of potential time slot configurations comprising a receive time slot, a transmit time slot, and at least one time slot that is not used or whose usage is denied in accordance with polling rules, a sequence of time slots in each of the potential time slot configurations being equivalent but different relative to other potential time slot configurations of the plurality of potential time slot configurations;
   determining, by the wireless device, for each of a plurality of the intervals of the communications of the second radio modem and for each potential time slot configuration of the plurality of potential time slot configurations that may be used for a respective interval,
      a number of the receive time slots of the first radio modem that would be degraded if a respective potential time slot configuration was given priority over the receive time slots of the first radio modem, based at least in part on the frame offset, and
      a number of transmit time slots of the first radio modem that would be degraded if the respective potential time slot configuration was given priority over the transmit time slots of the first radio modem, based at least in part on the frame offset;
   selecting, by the wireless device, a time slot configuration from the plurality of potential time slot configurations that would result in less degradation to communications of the first radio modem than other potential time slot configurations, based on the number of receive time slots and the number of transmit time slots that would be degraded; and controlling communications of the second radio modem using the time slot configuration until a change in an overall timing offset between the communications of the first radio modem and the communications of the second radio modem changes the frame offset, reducing degradation of the communications of the first radio modem due to conflicting time slots between communications of the first radio modem and the second radio modem.

2. The method of claim 1, further comprising:
stopping transmission of the first radio modem during conflicting subframes.

3. The method of claim 1, in which the conflicting occurs when a transmission from the first radio modem occurs at the same time as receiving at the second radio modem and also when receiving at the first radio modem at the same time as transmitting from the second radio modem.

4. The method of claim 1, in which each potential time slot configuration comprises a single transmit time slot and a single receive time slot within the interval.

5. The method of claim 1, in which the second radio modem comprises an ISM modem and the first radio modem comprises an LTE modem.

6. The method of claim 5, in which the ISM modem is a Bluetooth modem and the plurality of potential time slot configurations are enhanced synchronous connection oriented (eSCO) time slot configurations.

7. The method of claim 1, in which the selecting of the time slot configuration prioritizes scheduling communications using time slots with improved performance.

8. An apparatus operable in a wireless communication system, the apparatus comprising:
means for determining a frame offset between communications of a first communication resource and communications of a second communication resource, the communications of the first communication resource being asynchronous with the communications of the second communication resource;
means for determining a plurality of potential time slot configurations that may be used for an interval of the communications of the second communication resource, each of the plurality of potential time slot configurations comprising a receive time slot, a transmit time slot, and at least one time slot that is not used or whose usage is denied in accordance with polling rules, a sequence of time slots in each of the potential time slot configurations being equivalent but different relative to other potential time slot configurations of the plurality of potential time slot configurations;
means for determining, for each of a plurality of the intervals of the communications of the second communication resource and for each potential time slot configuration of the plurality of potential time slot configurations that may be used for a respective interval,
a number of receive time slots of the first communication resource that would be degraded if a respective potential time slot configuration was given priority over the receive time slots of the first communication resource, based at least in part on the frame offset, and
a number of transmit time slots of the first communication resource that would be degraded if the respective potential time slot configuration was given priority over the transmit time slots of the first communication resource, based at least in part on the frame offset; and
means for selecting a time slot configuration of the plurality of potential time slot configurations that would result in less degradation to communications of the first communication resource than other potential time slot configurations, based on the number of receive time slots and the number of transmit time slots that would be degraded; and
means for controlling communications of the second communication resource using the time slot configuration until a change in an overall timing offset between the communications of the first communication resource and communications of the second communication resource changes the frame offset, reducing degradation of the first communication resource due to conflicting time slots between the first communication resource and the second communication resource.

9. The apparatus of claim 8, further comprising means for stopping transmission of the first communication resource during conflicting subframes.

10. The apparatus of claim 8, in which each potential time slot configuration comprises a single transmit time slot and a single receive time slot within the interval.

11. A computer program product configured for wireless communication, the computer program product comprising:
a non-transitory computer-readable storage program code recorded thereon, the program code comprising:
program code to determine a frame offset between communications of a first communication resource and communications of a second communication resource, the communications of the first communication resource being asynchronous with the communications of the second communications resource;
program code to determine a plurality of potential time slot configurations that may be used for an interval of the communications of the second communication resource, each of the plurality of potential time slot configurations comprising a receive time slot, a transmit time slot, and at least one time slot that is not used or whose usage is denied in accordance with polling rules, a sequence of time slots in each of the potential time slot configurations being equivalent but different relative to other potential time slot configurations of the plurality of potential time slot configurations;
program code to determine, for each of a plurality of the intervals of the communications of the second communication resource and for each potential time slot configuration of the plurality of potential time slot configurations that may be used for a respective interval,
a number of receive time slots of the first communication resource that would be degraded if a respective potential time slot configuration was given priority over the time slots of the first communication resource, based at least in part on the frame offset, and
a number of transmit time slots of the first communication resource that would be degraded if the respective potential time slot configuration was given priority over transmit time slots of the first communication resource, based at least in part on the frame offset; and
program code to select a time slot configuration from the plurality of potential time slot configurations that would result in less degradation to communications of the first communication resource than other potential time slot configurations, based on the number of the receive time slots and the number of transmit time slots that would be degraded; and
program code to control communications of the second communication resource using the time slot configuration until a change in an overall timing offset between the communications of the first communication resource and the communications of the second communication resource changes the frame offset, reducing degradation of the first communication resource due to conflicting time slots between the first communication resource and the second communication resource.

12. The computer program product of claim 11, in which the program code further comprises program code to stop transmission of the first communication resource during conflicting subframes.

13. The computer program product of claim 11, in which each potential time slot configuration comprises a single transmit time slot and a single receive time slot within the interval.

14. An apparatus configured for operation in a wireless communication network, the apparatus comprising:
a memory; and
at least one processor coupled to memory, the at least one processor being configured:
to determine a frame offset between communications of a first communication resource and communications of a second communication resource, the communications of the first communication resource being asynchronous with the communications of the second radio resource;
to determine a plurality of potential time slot configurations that may be used for an interval of the communications of the second communication resource, each of the plurality of potential time slot configurations comprising a receive time slot, a transmit time slot, and at least one time slot that is not used or whose usage is denied in accordance with polling rules, a sequence of time slots in each of the potential time slot configurations being equivalent but different relative to other potential time slot configurations of the plurality of potential time slot configurations;
to determine, for each of a plurality of intervals of the communications of the second communication resource, based at least in part on the frame offset, and for each potential time slot configuration of the plurality of potential time slot configurations that may be used for a respective interval,
a number of receive time slots of the first communication resource that would be degraded if a respective potential time slot configuration was given priority over the receive time slots of the first communication resource, based at least in part on the frame offset, and
a number of transmit time slots of the first communication resource that would be degraded if the respective potential time slot configuration was given priority over the transmit time slots of the first communication resource, based at least in part on the frame offset; and
to select a time slot configuration of the plurality of potential time slot configurations that would result in less degradation to communications of the first communication resource than other potential time slot configurations, based on the number of receive time slots and the number of transmit time slots that would be degraded; and
to control communications of the second communication resource using the time slot configuration until a change in overall timing offset between the communications of the first communication resource and the communications of the second communication resource changes the frame offset, reducing degradation of the first communication resource due to conflicting time slots between the first communication resource and the second communication resource.

15. The apparatus of claim 14, in which the at least one processor is further configured to stop transmission of the first communication resource during conflicting subframes.

16. The apparatus of claim 14, which the conflicting occurs when a transmission from the first communication resource occurs at the same time as receiving at the second communications resource and also when receiving at the first communication resource at the same time as transmitting from the second communications resource.

17. The apparatus of claim 14, in which each potential time slot configuration comprises a single transmit time slot and a single receive time slot within the interval.

18. The apparatus of claim 14 in which the second communication resource comprises an ISM modem and the first communication resource comprises an LTE modem.

19. The apparatus of claim 18, in which the ISM modem is a Bluetooth modem and the plurality of potential time slot configurations are enhanced synchronous connection oriented (eSCO) time slot configurations.

20. The apparatus of claim 14 in which the at least one processor selects the first time slot configuration which gives priority to scheduling communications using time slots with improved performance.

* * * * *